Jan. 18, 1966

J. D. GRIFFITHS

CARRIER CENERATOR FOR SUPPRESSED-CARRIER SINGLE-SIDEBAND TRANSMISSION

Filed Feb. 21, 1963

3,230,456

INVENTOR.
JOHN D. GRIFFITHS

BY Wade Koontz

ATTORNEY

United States Patent Office 3,230,456

Patented Jan. 18, 1966

3,230,456

CARRIER GENERATOR FOR SUPPRESSED-CARRIER SINGLE-SIDEBAND TRANSMISSION

John D. Griffiths, Warren, Ohio, assignor to the United States of America as represented by the Secretary of the Air Force Filed Feb. 21, 1963, Ser. No. 260,336
2 Claims. (Cl. 325—329)
(Granted under Title 35, U.S. Code (1952), sec. 266)

Figure 1:
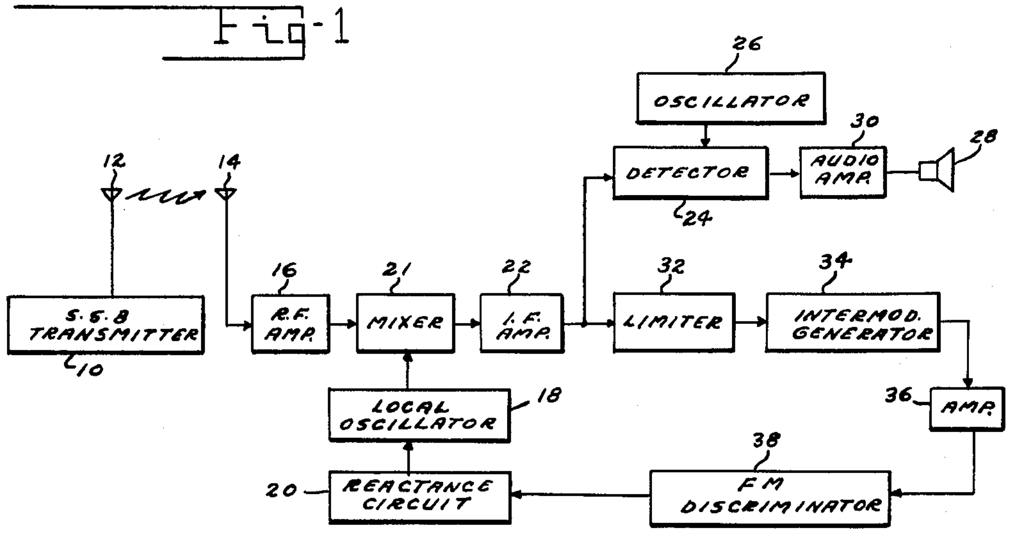

The invention described herein may be manufactured and used by or for the United States Government for governmental purposes without payment to me of any royalty thereon.

This invention relates to radio communication systems and, particularly, to a single-sideband voice communication system of the supressed carrier type.

One form of single-sideband transmission consists of supressing not only the carrier frequency of the transmitted wave but one sideband as well, and thus one group of waves is transmitted having the frequency of the carrier plus (or minus) the signal component frequencies. But by suppression of the carrier frequency the reference frequency to which the remaining sideband must be added at the receiver is lost. Thus, in the case of suppressed carrier working, for the single-sideband system to be effective and to obtain distortionless demodulation of the intelligence, it is necessary to add at the receiver a wave of the same frequency as that suppressed. Without this step, detection of the remaining sideband alone would not result in full extraction of the signal component.

It is, therefore, and object of the invention to provide a system, in which the correct carrier frequency wave is derived at the receiver in a form enabling it to be used as the frequency standard.

In prior art communication systems working at single sideband, one widely adopted approach to carrier insertion is the transmission of a pilot signal being used to synchronize a local oscillator which reintroduces the carrier, or the transmission of a carrier signal at a very low level relative to the sideband. Such methods are successful since at the receiver the supressed carrier immediately is known. When the carrier frequency is unknown, as in the case of a single-sideband subjected to Doppler shift, such methods of carrier insertion obviously become impractical.

Accordingly, it is another object of the invention to provide a carrier-suppressed single-sideband system wherein the received signal with carrier suppressed exercises control over the insertion frequency essential for reproduction fidelity.

The invention is readily adaptable to the field of voice communication. Voice messages from high performance aircraft receive particular attention since at these speeds a common disadvantage noticeable at high frequencies is the Doppler shift in the transmitted signal. A greater understanding of the invention therefore will be gained from a brief review of the audio characteristics of the human voice.

Each speech sound consists of a fundamental frequency and many harmonics of that frequency whose radiation, along with the fundamental, make up a complex wave of exact harmonic relation. The spectrum separation between any two adjacent harmonics is the same as the fundamental frequency itself. The fundamental frequency will vary with the voice sounds but, despite such variations, the difference relation between adjacent harmonics will always remain equal to the fundamental.

Figure 2:
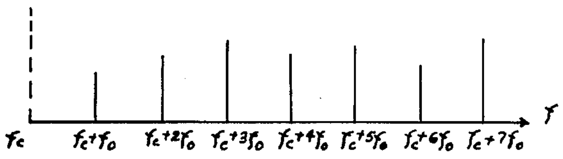
Figure 3:
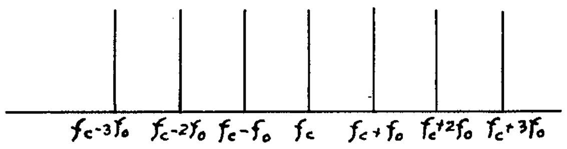

A complete understanding of the invention and an introduction to other objects and features not specifically mentioned may be had during the course of the following description when read in conjunction with the appended drawings wherein:

FIG. 1 shows a block diagram of the carrier-suppressed single-sideband communication system of the invention; and FIG. 2 and FIG. 3 show certain spectral relationships of harmonic components of waves present in the system of FIG. 1.

Referring now to FIG. 1, a single-sideband transmitter 10 coupled to an antenna 12 radiates into the ether a signal transmitted by sideband only, that is, with the carrier suppressed. The single sideband may, for example, be the uper sideband components as represented in FIG. 2. This sideband, having harmonic components differing in frequency from the transmitter carrier wave $f_c$ by multiples of the fundamental voice frequency $f_o$, is impressed on a receiver having an antenna 14 coupled to a radio frequency amplifier 16. The representation of $f_c$ is dashed as normally indicative of suppression. Connected to the output of amplifier 16, and receiving a second input from a local oscillator 18 having a controlling reactance circuit 20, is a mixer 21 which converts the single-sideband signal impressed on antenna 14 to a lower or intermediate signal, in the characteristic manner of superheterodyne receivers. The single-sideband signal now lowered to the intermediate frequency is amplified by a IF amplifier 22. From amplifier 22 the single-sideband IF signal is fed to a detector 24 of any suitable type which, in conjunction with the output of an oscillator 26, produces the envelope of the original modulating signal. The audio output of detector 24 is reproduced audibly in a translating device 28 following amplification in an audio amplifier 30. The signal taken from amplifier 30 thus forms the audio output of the system.

In accordance with the invention, amplifier 22 also feeds the IF single-sideband signal to a limiter 32 of suitable type which, in a conventional manner, removes or at least greatly reduces all amplitude variations in the sideband waves. The result at the output of limiter 32 is a wave of essentially constant amplitude composed of a band of intermediate frequency components differing from each other by the fundamental voice frequency. Stated differently, in heterodyning the incoming single-sideband signal to a lower part of the spectrum, i.e., to the intermediate frequency level, the harmonic relation between adjacent harmonics is preserved. The limited signal is applied to an intermodulation generator 34, which may be a non-linear detector. It is well known that where two frequencies $f_1$ and $f_2$ in a signal pass through a non-linear network, intermodulation will occur with the production of a signal with frequencies $mf_1 \pm nf_2$, where $m$ and $n$ are integers. Any wideband nonlinear amplifier, such as a harmonic generator or a wide-band diode may be used satisfactorily as generator 34. Accordingly, in the lower channel multiple waves are generated which have frequencies related to integral multiples of frequencies present in the intermediate frequency signal.

Referring now to FIG. 3, which represents the output of generator 34, it can be seen that the lower sideband as well as the carrier frequency $f_c$ is included in the intermodulation products. In general, the output of a non-linear device may be represented as the sum of a power series:

$$e_{out} = a_1 e_{in} + a_2 e_{in}^2 + a_3 e_{in}^3 + \dots \quad (1)$$

where $e_{in}$ is the input to the device.

Let $$e_{in} = P \cos pt + Q \cos qt \quad (2)$$

where $$p = f_c + f_0 \quad (3)$$

and $$q = f_c + 2f_0 \quad (4)$$

The first term in the output is just $a_1$ times the input. The second term is:

$$a_2 e_{in}^2 = a_2(P \cos pt + Q \cos qt)^2 \quad (5)$$

Using the formula:

$$\cos(\theta+\Phi) + \cos(\theta-\Phi) = 2\cos\theta\cos\Phi \quad (6)$$

$$a_2 e_{in}^2 = \frac{a_2}{2}P^2 + \frac{a_2}{2}Q^2 + \frac{a_2}{2}P^2 \cos 2pt + \frac{a_2}{2}Q^2 \cos 2qt + a_2 PQ \cos(p+q)t + a_2 PQ \cos(p-q)t \quad (7)$$

This term, $a_2 e_{in}^2$, would result from a pure square law device.

Note that the third term of $a_2 e_{in}^2$ in Equation 7 is $$\frac{a_2}{2} P^2 \cos 2pt = \frac{a_2}{2} P^2 \cos 2(f_c+f_0)t \quad (8)$$

Likewise, the first term, $a_1 e_{in}$, contains $f_c+2f_0$.

Thus, since both $f_c+f_0$ and $f_c+2f_0$ are present in the signal applied to generator 34, it will be understood that they are also present in the output of generator 34. These waves when considered together for the solution of their difference frequency yield $f_c$, as shown in the equation $$2(f_c+f_0) - (f_c+2f_0) = f_c \quad (9)$$

An amplifier 36 is coupled to the output of intermodulation generator 34 and, in turn, is coupled to an FM discriminator 38 having, in the usual manner, a voltage output curve symmetrical about a center frequency. In the instance given, the center frequency is approximately the frequency $f_c$. Discriminator 38 is coupled to reactance circuit 20 which controls the output frequency of oscillator 18. The voltage applied to reactance circuit 20 from discriminator 38 is zero for zero frequency deviation from the discriminator center frequency. The frequency of oscillator 26 also matches the center frequency of the discriminator.

Thus, it may be seen that when the intermodulation products produced by generator 34 combine in the manner previously described to give a wave which is at the center frequency of discriminator 38, the input to reactance circuit 20 is zero. In the example illustrated, no change of the frequency of oscillator 18 will be effected when such an error voltage is lacking. However, for any change in the output of mixer 21 which produces a frequency component from generator 34 which deviates from the center frequency of discriminator 38, an AFC error voltage having a polarity indicative of the direction of deviation is supplied to reactance circuit 20. A potential will appear at oscillator 18 whereby its frequency is changed in the proper direction necessary to return the carrier frequency to the center frequency of the discriminator.

With the specific apparatus of the invention, it is obvious that received suppressed-carrier single-sideband transmission is converted to intelligible demodulation of the fundamental and harmonic overtones of any voice wave. Any waveform delivered by the mixer ultimately will reach the correct frequency for which a zero deviation output is produced by the discriminator. The proper local oscillator frequency therefore is delivered without the need of an independent frequency standard, precision oscillator, or like arrangement.

Although one embodiment of the invention has been illustrated and described, it will be apparent to those skilled in the art that various changes and modifications may be made therein without departing from the spirit of the invention or the scope of the appended claims.

I claim:

1. A single-sideband suppressed-carrier system receiving single-sideband suppressed-carrier signals of harmonically related audio frequencies and comprising:

a mixer receiving said signals,
a local oscillator connected to heterodyne said signals in said mixer to derive single-sideband suppressed-carrier intermediate frequency energy composed of waves retaining the harmonic relation,
reactance means for controlling the frequency of said oscillator,
an oscillator of constant frequency,
detecting means coupled to said mixer and to said constant frequency oscillator for demodulating said single-sideband suppressed-carrier intermediate frequency energy,
limiting means coupled to said mixer for smoothing amplitude variations of said single-band suppressed-carrier intermediate energy,
means fed by said limiting means for intermodulating the amplitude limited wave to produce an alternating potential varying at the carrier frequency of said single-sideband suppressed-carrier intermediate frequency energy, and
an automatic frequency control means having the frequency of said constant frequency oscillator as a reference frequency, said control means interconnecting said intermodulating means and said reactance means for generating from said carrier frequency energy a corrective voltage which so adjusts the frequency of said local oscillator that the frequency of the suppressed-carrier of said intermediate frequency energy is maintained in equality with said reference frequency.

2. A single-sideband suppressed-carrier system having means for receiving single-sideband suppressed-carrier signals of harmonically related audio frequencies and comprising:

heterodyning means including a local oscillator for converting said signals to a band of harmonically related signals of intermediate frequency energy,
reactance circuit means for controlling the frequency of said oscillator,
a second oscillator of constant frequency,
detecting means coupled to said second oscillator and receiving said band of signals for deriving the intelligence information therein,
limiting means receiving said band of signals for producing a wave of substantially constant amplitude,
means fed by said limiting means having intermodulation producing characteristics for deriving from said amplitude-limited wave a voltage of a frequency equal to the suppressed-carrier of said intermediate frequency energy, and
a frequency discriminator having a center frequency equal to the frequency of said second oscillator,
said discriminator interconnecting said intermodulation means and said reactance circuit means and being adjusted to deliver no error signal to said reactance circuit means when said intermediate frequency carrier has no frequency deviation from the center frequency of said discriminator.

References Cited by the Examiner

UNITED STATES PATENTS

| | | | |
|---|---|---|---|
| 2,847,567 | 8/1958 | Jacobsen | 325—423 X |
| 2,999,154 | 9/1961 | Krause | 325—329 |

ROBERT H. ROSE, *Primary Examiner.*

R. S. BELL, *Assistant Examiner.*